UNITED STATES PATENT OFFICE.

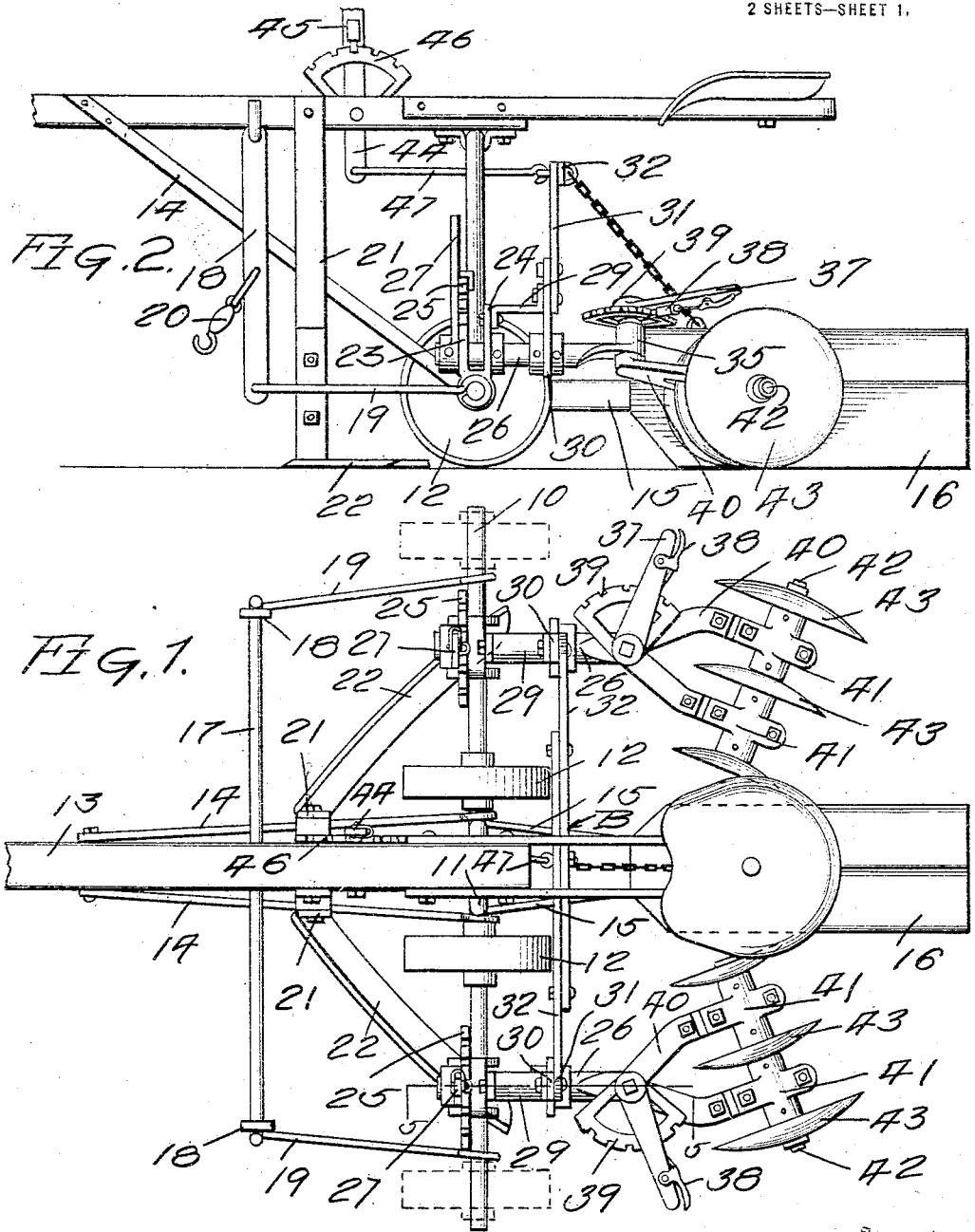

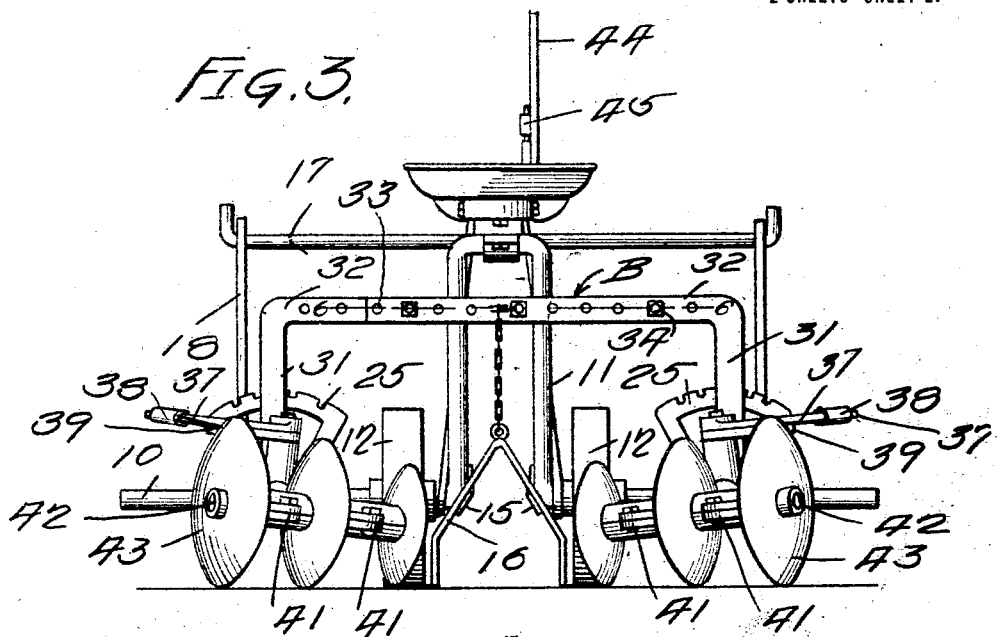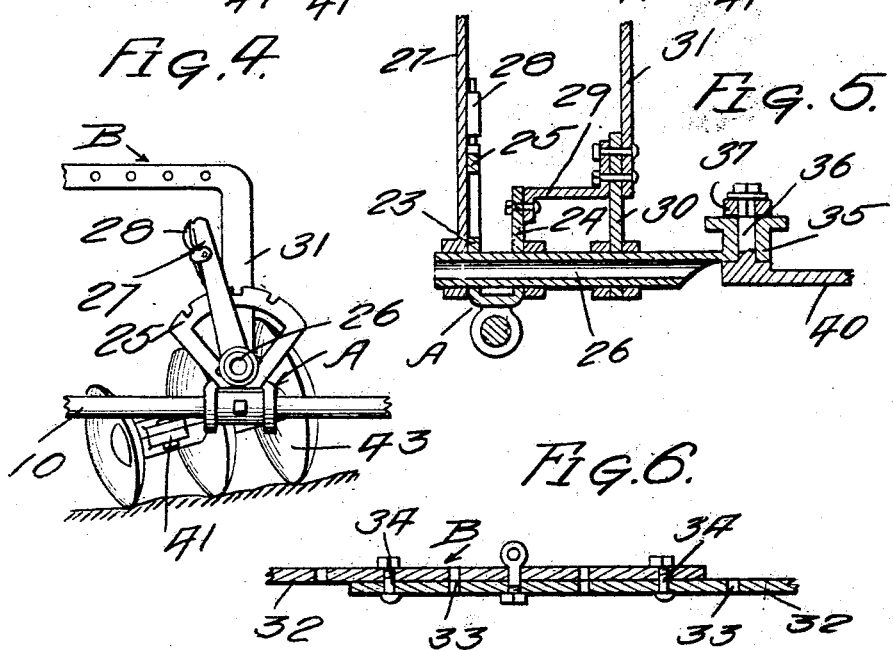

JOHN E. CRADDOCK, OF HEDLEY, TEXAS.

DISK CULTIVATOR.

1,169,127. Specification of Letters Patent. Patented Jan. 25, 1916.

Application filed December 30, 1914. Serial No. 879,721.

*To all whom it may concern:*

Be it known that I, JOHN E. CRADDOCK, a citizen of the United States, residing at Hedley, in the county of Donley, State of Texas, have invented certain new and useful Improvements in Disk Cultivators; and I do hereby declare the following to be a full, clear, and exact description of the invention, such as will enable others skilled in the art to which it appertains to make and use the same.

This invention relates to disk cultivators and particularly those of the sulky type.

The object of the invention resides in the provision of a cultivator of the type named in which the supporting wheels may be adjusted so as to be disposed different distances apart and in which the cultivating disks can be adjusted with ease and facility both in vertical and horizontal planes.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a disk cultivator constructed in accordance with the invention: Fig. 2, a side view of same; Fig. 3, a rear view of the invention; Fig. 4, a front view of a fragment of the cultivator; Fig. 5, a section on the line 5—5 of Fig. 1, and Fig. 6, a section on the line 6—6 of Fig. 3.

Referring to the drawings the cultivator is shown as comprising an axle 10 having a central arch portion 11. Adjustably mounted on the axle 10 on opposite sides of the arch portion 11 are traction wheels 12 respectively, said traction wheels being adapted to be adjusted to either the full line position or the dotted line position in Fig. 1. Rigidly mounted upon the arch portion 11 is a draft tongue 13 which is connected by braces 14 with the axle 10, the rear end of said braces being secured to the axle 10 adjacent the lower ends of the arch portion 11. Connected to the horizontal portions of the axle 10 are arms 15 which have fixedly secured to their free ends a shield 16 of the usual and well known construction. Secured to the draft tongue 13 forward of the axle 10 and transversely of said tongue is a bar 17 and depending from the ends of this bar respectively are arms 18, the lower ends of said arms being connected to the axle 10 by means of links 19. Carried by each arm 18 is a swingle tree 20 whereby the desired draft animals may be attached. Depending from the draft tongue 13 and secured to respective sides thereof are bars 21 which have secured to their lower ends laterally directed knives 22 which serve to cut the weeds during the operation of the machine. Pivotally mounted on the axle 10 on each side of the arch portion 11 is a U-shaped member A including front and rear arms 23 and 24 respectively. The upper end of the front arm 23 of each U-shaped member terminates in a toothed segment 25.

Rotatably mounted in the arms 23 and 24 of each member A is a shaft 26 which has fixed on the forward end thereof a lever 27 whereby said shaft may be rotated. This lever 27 carries a spring pawl 28 adapted to coöperate with the toothed segment 25 for the purpose of locking the shaft 26 against rotation. Secured to the arm 24 of each member A is a bracket 29 which supports a bearing 30 for the shaft 26 and also supports one of the sections 31 of an arch member B. Each of the sections 31 of the arch member B includes a transverse arm 32 disposed in overlying relation with respect to the transverse arm of the other section and both of the arms 32 are provided with openings 33 whereby the width of the arch member B may be varied as desired, the sections of the arch member being secured against relative movement by bolts 34 passed through registering openings 33. The rear end of each shaft 26 terminates in a bearing 35 disposed at right angles to the longitudinal axis of said shaft and having journaled therein a shaft 36. Fixed on the upper end of each shaft 36 is a lever 37 carrying a spring pawl 38 adapted to coöperate with a toothed segment 39 formed integral with the bearing 35. Formed on the lower end of each shaft 36 is a U-shaped frame 40 the arms of which carry bearings 41 rotatably supporting a shaft 42 and fixed on this shaft in the usual and well known manner are cultivating disks 43. By this construction it will be apparent that by operating the lever 27 and rotating the shaft 26 the cultivating disk 43 can be adjusted in a vertical plane, while operation of the lever 37 will adjust the cultivating disk in a horizontal plane. It will be further apparent that by removing the U-shaped members A from the axle 10 and then removing the wheels 12 these parts can be replaced upon the axle with the wheels 12 in the dotted line position shown in Fig. 1. Pivotally mounted upon the tongue 13 is a lever 44 carrying a spring pawl 45 which coöperates with a toothed segment 46 also mounted upon the tongue 13. The lower end of the lever 45 is connected to the arch member B by means of a link 47, while said arch member is connected to the rear end of the shield 16 by means of a chain 48. By moving the upper end of the lever 44 rearwardly it will be obvious that the disk gangs will be elevated as will also the rear end of the shield 15.

What is claimed is:—

1. A cultivator comprising an axle, a U-shaped member rotatably mounted on the axle, a shaft journaled in the arms of said U-shaped member, means for rotating said shaft, a bearing on the rear end of said shaft, a vertical shaft rotatably mounted in said bearing, means for rotating said vertical shaft, a U-shaped member fixed on the vertical shaft, and a disk gang carried by the U-shaped member.

2. A cultivator comprising an axle having an arch central portion, a draft tongue secured to said arch portion, a U-shaped member rotatably mounted on the axle on each side of the arch portion, traction wheels journaled on said axle, a shaft journaled in the arms of each U-shaped member, means for rotating said shaft, an arch member connecting the shafts journaled in the U-shaped members, a lever pivoted on the tongue, connections between said lever and the arch member whereby the movement of said lever will swing the arch member to rotate the U-shaped members on the axle, a bearing on the rear end of each shaft, vertical shafts rotatably mounted in each of said bearings, means for rotating each vertical shaft, a U-shaped member fixed on each vertical shaft, and a disk gang carried by the U-shaped member.

In testimony whereof, I affix my signature, in the presence of two witnesses.

JOHN E. CRADDOCK.

Witnesses:
R. B. CLONINGER,
DALLAR MILNER.